June 17, 1941.  G. R. HOLMANN  2,245,586
HOT AIR HEATING FURNACE
Filed Feb. 9, 1940  4 Sheets-Sheet 1

INVENTOR
Gustave R. Holmann
BY
Smith & Tuck
ATTORNEYS

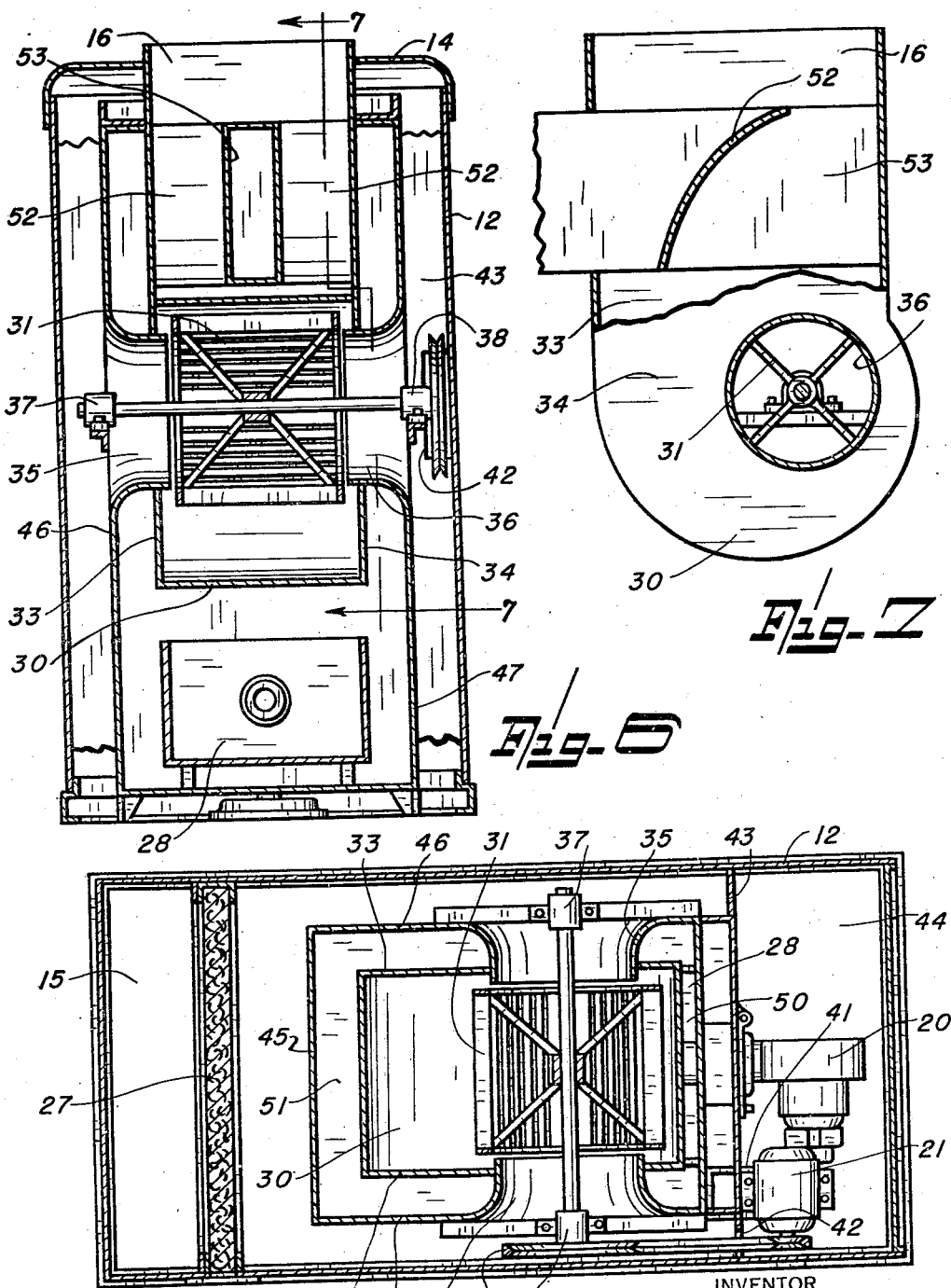

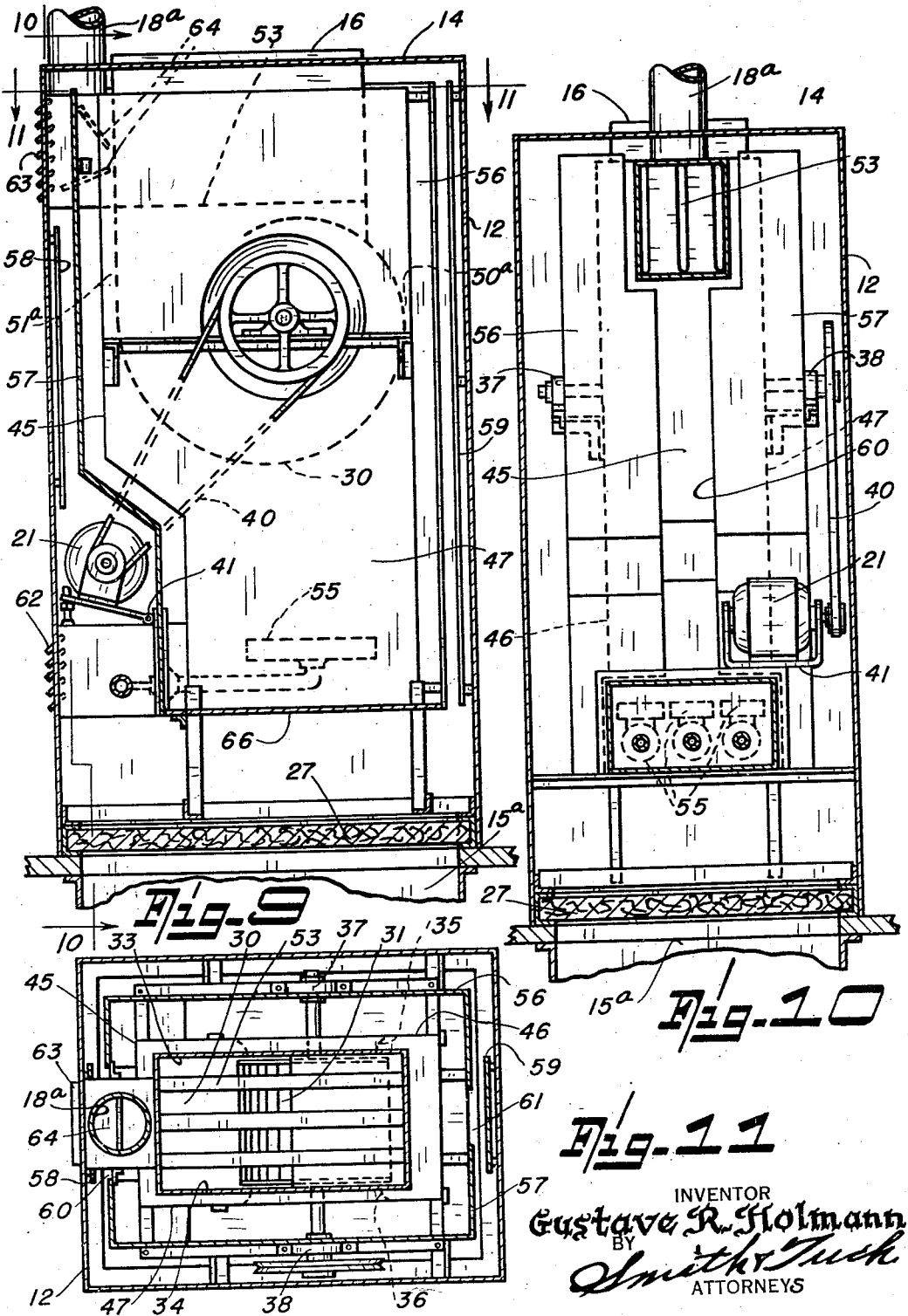

Patented June 17, 1941

2,245,586

UNITED STATES PATENT OFFICE 2,245,586

HOT AIR HEATING FURNACE

Gustave R. Holmann, Seattle, Wash.

Application February 9, 1940, Serial No. 318,151

1 Claim. (Cl. 126—110)

My present invention relates to a hot air heating furnace that is characterized by having a rectangular, outer casing of small overall dimensions, and having therein the burner assembly, a metal fire box above which is disposed a metal conduction scroll interposed between the furnace body sides and providing a stop or heat transfer means between the hot combustion gases and circulating air. A blower fan is suspended within the metal scroll and is disposed out of the heat zone with the blower disposed near the upper forward portion of the conducting scroll as a means for positively forcing air upwardly from the return inlet over the conducting scroll at a progressively increasing temperature and velocity until discharge of the heated air is made.

My furnace is especially characterized by its small overall dimensions, its component parts being disposed effectively and compactly. Being of small size the furnace may be easily standardized giving many manufacturing advantages as well as advantages in the installation and operation of the unit.

My unit may be, without sacrificing efficiency, adapted to coal, gas, or oil fuel supplies, and is of such a structure that it may be delivered from the manufacturer in package or kit form as its small size makes it easy to enter, completely assembled, through any standard door.

A further advantage is that this small, compact unit may be effectively used in what are normally unoccupied or marginal spaces within a home already constructed. Its structure is such that it may be completely assembled, fitted, and wired at the factory, with the controls and all internal wiring completely enclosed within the outer casing; and all the parts are freely accessible for servicing.

The principal object of my present invention is to provide a very compact heating unit that can be economically manufactured and easily installed in restricted places.

A further object of my present invention is to provide a hot air heating unit in which heat is produced by passing air, at high velocity, over the heating surfaces in a manner insuring intimate contact of all the air with the heating surface.

A further object of my invention is to provide a furnace that does not require the usual plenum chamber.

A further object of my invention is to provide a furnace in which there is no need for the maintenance of reserve heat; consequently, when there is a call for heat the same can be supplied with a minimum average lag.

A further object is to provide a heating unit in which there is a minimum of latent or retentive heat to influence the lag or to create losses or overbalanced or appressive temperature conditions.

A further object of my present invention is to provide a high velocity operation which, while promoting unusually high efficiency in heating, also makes it possible, due to the small size of ducts required, to make a neater installation and, owing to their small size, a cheaper duct system.

Other and more specific objects will be apparent from the following description taken in connection with the accompanying drawings, wherein Figure 1 is a perspective view showing one form of my furnace of the type most readily adapted to oil or coal firing.

Figure 6 is an end elevation, in section, taken along the line 6—6 of Figure 4.

Figure 7 is a fragmentary, vertical, sectional view taken along the line 7—7 of Figure 6.

Figure 8 is a cross-sectional view, in plan, taken along the line 8—8 of Figure 4.

Figure 9 is a longitudinal, vertical, sectional view through a modified form of my furnace such as has been found most suitable for a unit with gas firing.

Figure 10 is a vertical end section taken along the line 10—10 of Figure 9.

Figure 11 is a plan view, in section, taken along the line 11—11 of Figure 9.

Figures 1, 2, 3:
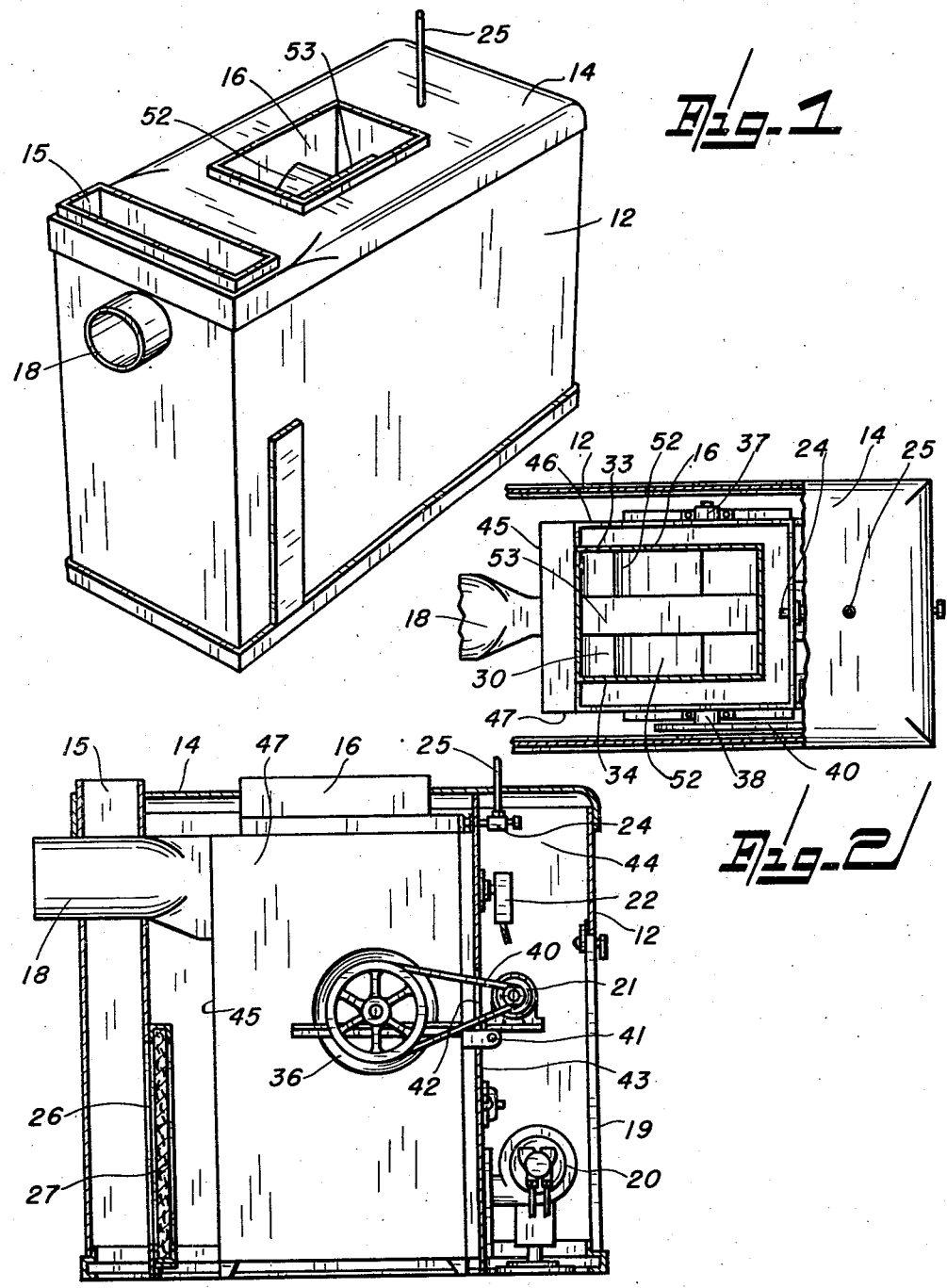
Figure 2 is a partial, top plan view with certain parts shown in section.
Figure 3 is an elevation showing certain parts in section to more fully illustrate their construction.

Referring to the drawings throughout which like reference characters indicate like parts 12 designates the outer housing or covering of my unit. This consists of four enclosed sides and the cover member 14. The cover is pierced to provide the cold air return line 15 and the hot air discharge 16. The usual stack fitting 18 is employed. The front cover member is provided with a removable door portion 19 so that access can be readily had to the oil burner 20, or whatever heating unit is employed, together with the fan motor 21 and the control units 22. A humidifying device is provided at 24 which is fed by the water feed pipe 25 which is normally connected to the ordinary water pressure system. In the oil burning or coal stoker types, the draft is downwardly through passage 15 which is provided with an opening at 26 so that the air may enter and pass through standard filter cartridges disposed at 27.

I prefer that my heating unit, if it is to be liquid or solid fuel, produce its fire in a steel fire box 28 from which the products of combustion are deflected upwardly against the curved metal bottom of a scroll-shaped casing 30 mounted in the upper part of the combustion chamber above the fire box 28. This casing is formed with an interior curved flange 30a that forms a continuation or extension of the curved bottom of the scroll-shaped casing 30 so that the blower fan 31 may be positioned toward the front of the casing and near the top of the scroll shaped casing 30 beneath the flange 30a, as is particularly well shown in Figure 4. The major portion of the fan blower is thus enclosed within the casing beneath the flange 30a and the blower fan 31 as arranged in the casing provides the scroll-shaped air-heating space or chamber which increases in area toward the discharge or outlet 16 for hot air. With this arrangement it will be noted that the air, as it is drawn in at the ends of the fan, enters a true involute scroll within the casing 30, and as the air normally becomes progressively heated the scroll becomes larger in cross section so as to better accommodate the expanding air. The air is then finally driven upwardly and out through the hot air discharge 16. It will be noted that the involute or scroll 30 is provided with parallel sides 33 and 34 which are provided with belled openings, shown particularly in Figures 6 and 8 at 35 and 36. It is also to be noted that the fan-supporting bearings 37 and 38 are provided in the center of the air intake, as it passes through bells 35 and 36, so that they, at all times, will be relatively cool even though the flames from the fire play constantly on the scroll 30. Fan 31 is preferably driven by means of a belt 40 from a suitable motor 21. This motor I have preferred to mount on a bracket which is pivoted at 41 so that the weight of the motor will tend at all times to keep the drive belt 40 taut. The drive belt is arranged to pass out of the air intake stream through a narrow slit 42 formed in bulkhead 43 which serves to mask in the front of the furnace and provide the instrument and burner chamber 44.

It will be noted that the scroll-shaped casing 30 is mounted within the interior housing, which forms the combustion chamber, and the casing is spaced from the bulkheads 43 and 45 and the two side plates 46 and 47 of the interior housing, so that the passageway 50 in front of the scroll-shaped casing 30 is much smaller than the passageway 51 at the rear of the casing 30. This has been found to be a desirable relationship so that the maximum flow of hot gases of combustion will be up through passage-way 51 and, of course, around both sides of the casing 30. In this way, the principle of progressively heating the air as it is moved by fan 31 is fully carried out. It has also been found desirable to provide a pair of curved deflector plates as 52 so that, as air is passed around through the scroll, these deflectors 52 will deflect a portion of the air currents so that substantially uniform velocity will be delivered throughout the interior cross area of the discharge 16. Directly above the fan casing and blower is mounted a horizontal, centrally located, smoke duct 53, which is open to the combustion chamber above the passageway 50. This duct passes through the upper part of the casing 30, where the duct separates the two deflectors 52, 52, and also through a portion of the combustion chamber and its wall 45, and then merges with the smoke pipe 18.

Figure 4:
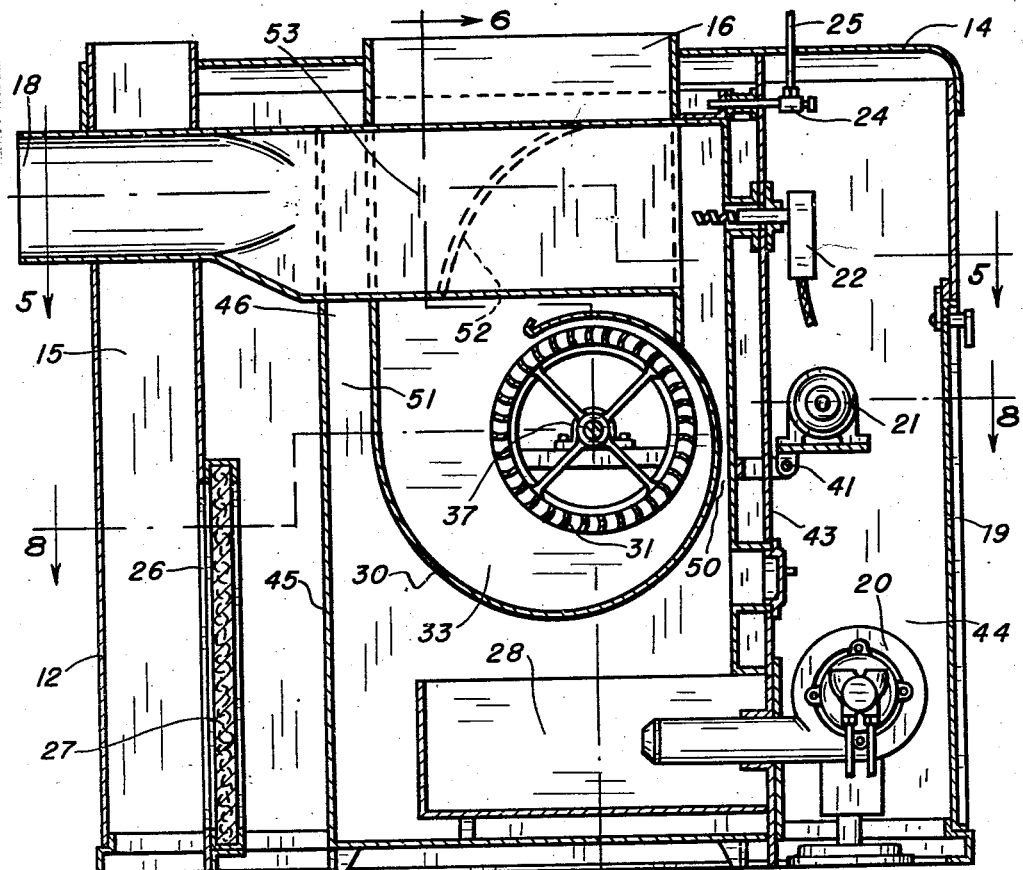
Figure 4 is a typical section, in elevation, through my furnace.
Figure 5:
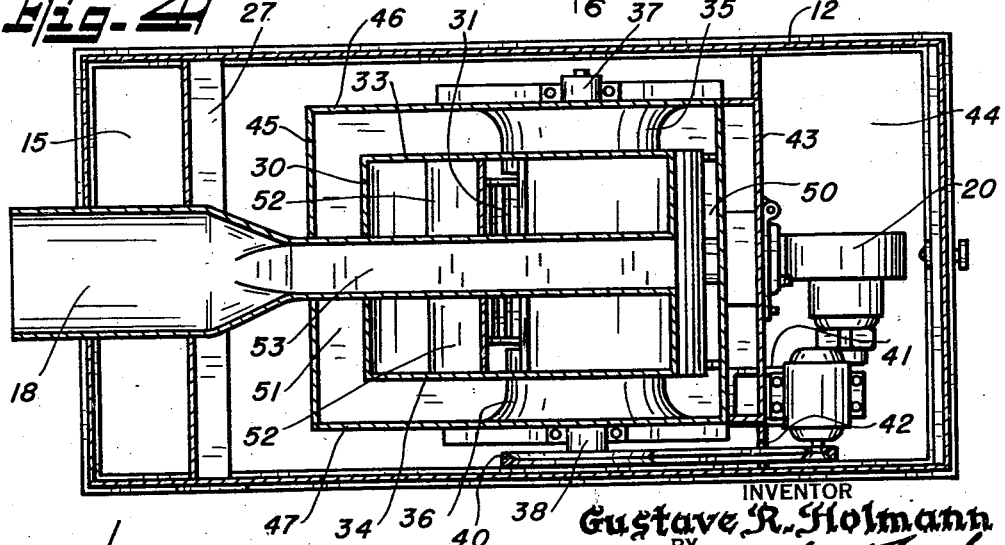
Figure 5 is a cross-sectional view taken along the line 5—5 of Figure 4.

The gaseous products of combustion pass around scroll shaped casing 30 and, as pointed out, the bulk of them pass towards the rear of the scroll through passage 51 and around the sides thereof, and then must come to the front of the furnace so as to enter the smoke duct 53 which, in turn, is connected to the stack connection 18. It has been found that in order to provide the uniform flow of hot gases around the heating scroll 30, that it is best to lead the gases on a duct passing through the discharge 16. In Figures 4, 5 and 6 I have indicated one such passage-way; however, where conditions permit this one large passage-way may best be broken into several smaller ones as indicated in Figures 10 and 11 where three such smoke flues or passage-ways are provided.

With certain types of fuel, such as gas for instance, it is desirable to slightly modify my furnace. This modification is shown in Figures 9, 10, and 11. The modification consisting, essentially, in providing means for taking care of the increased amount of radiant energy developed in the heating flames. In this instance the gas burners 55 are disposed at a relatively lower level than before so that the distance from the burner to the bottom of scroll 30 is increased. It has further been found that an interior baffling is desirable in order to maintain reasonable temperatures for the outer casing. To this end I have provided the baffle members 56 and 57 which are made substantially U-shaped; in other words, they have the full sides and partial end returns as are probably best shown in Figures 10 and 11. This forces the incoming air, which is introduced at the bottom of the unit either by the arrangement shown in Figure 4 or by coming up through the bottom as through intake member 15a, through the filter. It is then forced to circulate around the baffle members before it can enter into the fan chamber and there start its circulation through the scroll. To further prevent radiation I have provided the auxiliary baffles 58 and 59, spaced inwardly from the outer housing, so as to protect against radiation through the openings 60 and 61, which are provided by the baffle members 56 and 57 not coming together in the front and rear of the unit.

I have further provided some additional modifications in that louvres are provided at 62, to supply air to burners 55, and again at 63 to provide against backfiring or explosion within the heating chamber; and to this end I have further provided the dampers illustrated at 64, which may also be suitably adjusted to take care of occasional and undesirable changes of pressure within the combustion chamber. A smoke flue is shown at 18a. However, it has been found desirable, in this arrangement, as before, to maintain the same general position of the fan within the scroll; to have the flame play directly on the scroll so that the air will be progressively heated; and to have the narrow passageway at 50a and the increased passage-way at 51a.

*Method of operation*

In operating my heating unit it is desirable to consider the fact that the bulk of the heating of the air is to take place within a relatively short time and distance of travel, and it is, therefore, desirable to introduce the air into my unit at the lower portion of the same. In the form shown, particularly in Figure 4, air comes down duct 15, passes through filter 27, and then is deflected by bulkhead 45 so that it must, of necessity, flow around the two side plates 46 and 47 where it enters the fan chamber through the belled openings 35 and 36. Once the air is engaged by the fan, it is thrown violently out against the metal scroll 30 and the metal scroll is heated so that its coldest portion is directly above the fan, as viewed in Figure 4. Then, as the scroll continues around toward the rear of the unit, the flame action is such as to increase the temperature thereof and, in the same way, the fan forces the air around so that the air is progressively heated and is driven upwardly through duct 16, with the air last impinging upon the hottest portion of the scroll. This relatively short travel of the air during the heating period means that the heat, which might otherwise damage the metal scroll 30, is constantly being carried away and the force of fan 31 creates a turbulence which insures that the air will generally come in intimate contact with the scroll. In order that the maximum heat may be extracted from the flue gases, the gases of combustion are directed around the scroll, with the greater portion of them being directed to the rear thereof, and then they must pass to the front of the scroll so as to pass out the smoke passage-ways or passage-way 53—there being one shown in Figure 5 and three in Figure 11. The gases of combustion then pass out the stack at a relatively low temperature.

In the form illustrated in Figures 9, 10 and 11, I have shown a slight modification which may sometimes be employed when it is possible to pick up the cold air at the bottom of the heating unit. This may occur in a number of ways, and in this instance the filter is placed horizontally in the lower portion of the cabinet and the air passing up through it meets the bottom of the furnace proper, 66, which forces it around the heating chamber. This has the effect of giving the air primary heating, and also tends to preserve the desirable cool temperature for the outer casing. The air, as it passes upwardly, is forced by baffles 56 and 57 to take a rather circuitous route around the inner wall of the outer casing, and then is let in through openings 60 and 61 to the inner portion where it is introduced into the fan chamber and from that point on the operation is identical with that previously described.

With my unit it is possible to provide, in a very small housing, a heater having relatively large capacity; as the air, responding to movement of the blower fan, is directed tangentially into the curvature of the scroll, and then discharged therefrom into the delivery duct 16. Upon passage upwardly along the conducting or radiating scroll, temperature and velocity are progressively increased until the discharge is reached. The flow of radiated heat from the heating surface of the fire box is complemented by the direct flow of the hot gases from the combustion chamber and, in respect to the conducting scroll, an accumulative temperature is created that communicates its maximum potential heat to recirculated air at the point of discharge. There is no impediment in the flow of hot gases. There are no concentrations or stratifications of gases in the gas currents. There is, thus, an elimination of stresses and strains upon the material of the furnace, assuring long and uninterrupted service.

Incorporated in the main section of the furnace is a comparatively large heating surface. The air space between the front section of the furnace body and extending scroll is small contributing to its compactness. Important among the features of this furnace is the short interval between the fall of temperature below, for instance, 70 degrees and the delivery of warm air at the register. With a thermostatic call for heat, or for sudden loads, transmission of heat is made very quickly. The relatively high velocity operation admits of further compactness and efficiency. The increased velocity allays excessive infiltration, due to high winds or subnormal temperatures by a counter pressure factor. There is, further, no ventilating loss due to casing static pressure or need for the use of casing as a subplenum chamber. There is no need for the plenum chamber, further, because a greater effective velocity removes the need for a storage of hot air, thus, delivery of the heated air is made directly and immediately to the ducts. The standard controls normally found on automatic heating units may be incorporated in my equipment. As these units are very highly developed, it has been found that, even with the compact arrangement my unit affords, the various standard controls, as desired, can be very properly employed. The arrangement of my unit allows a wide range of B. t. u. output from a standardized unit by making minor changes in equipment.

The foregoing description and the accompanying drawings are believed to clearly disclose a preferred embodiment of my invention, but it will be understood that this disclosure is merely illustrative and that such changes in the invention may be made as are fairly within the scope and spirit of the following claim.

I claim:

In a hot air furnace, the combination with a cabinet forming a cold air chamber and an interior spaced housing forming a combustion chamber, a fire-box in the bottom of the housing and a heating unit therefor, of a casing mounted in and spaced from the housing, said casing having an interior flange and a rounded bottom forming an involute wall which terminates within the casing, a center-intake air impeller mounted in the casing beneath said flange, a cold air feed tube located at each end of the impeller and mounted in adjoining walls of the housing and casing, an outlet flue communicating with the combustion chamber and extending transversely through said casing a portion of the combustion chamber and a portion of the cold air chamber, and a pair of curved deflecting walls located at the opposite sides of the flue within the upper part of the casing for directing hot air currents.

GUSTAVE R. HOLMANN.